Figure 3:
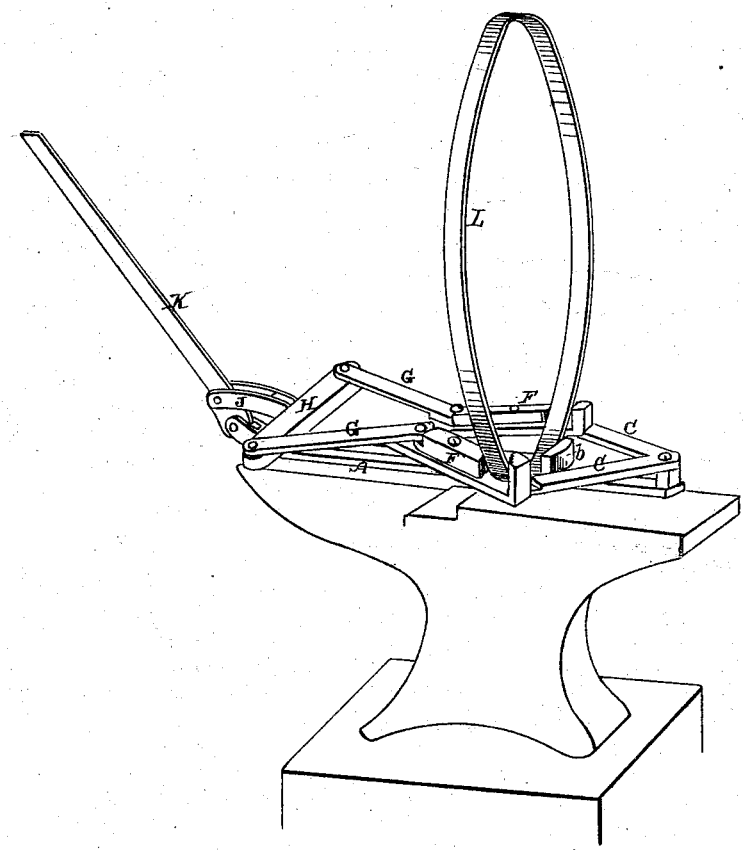

(No Model.) 2 Sheets—Sheet 1.
J. E. TIFFIN.
Tire Upsetter.
No. 239,407. Patented March 29, 1881.
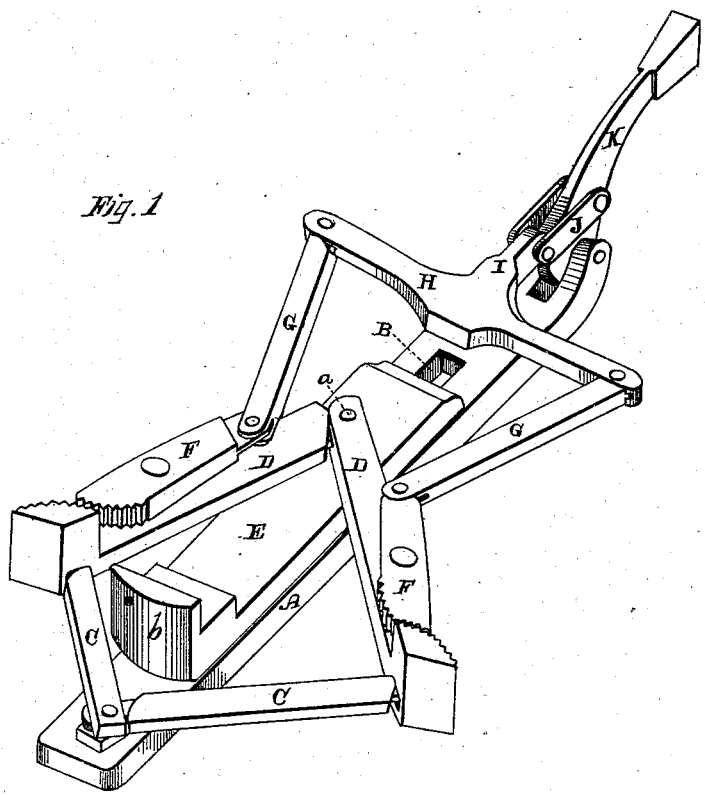
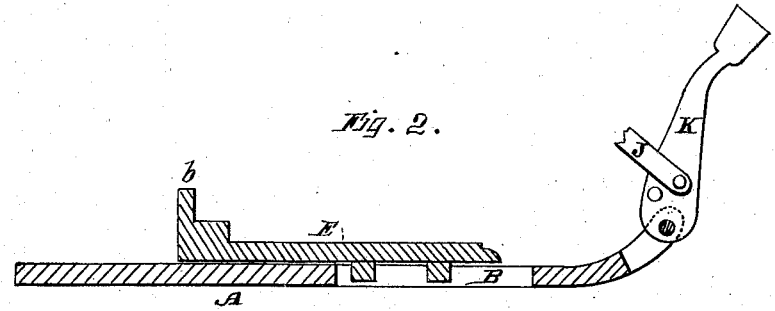
Witnesses
Geo. H. Strong
Frank A. Brooks
Inventor
John E. Tiffin
By Dewey & Co
Attys (No Model.) 2 Sheets—Sheet 2.

J. E. TIFFIN.
Tire Upsetter.

No. 239,407. Patented March 29, 1881.

Witnesses
Geo. H. Strong
Frank A. Brooks

Inventor
John E. Tiffin
By Dewey & Co.
Attys

UNITED STATES PATENT OFFICE.

JOHN E. TIFFIN, OF REDDING, CALIFORNIA, ASSIGNOR OF ONE-HALF TO WILLIAM A. SMITH, OF SAME PLACE.

TIRE-UPSETTER.

SPECIFICATION forming part of Letters Patent No. 239,407, dated March 29, 1881.

Application filed January 6, 1881. (No model.)

*To all whom it may concern:*

Be it known that I, JOHN E. TIFFIN, of Redding, county of Shasta, and State of California, have invented a Tire-Upsetter; and I hereby declare the following to be a full, clear, and exact description thereof.

My invention relates to a tire upsetter or shrinker, the novelty in which is in a peculiar arrangement of parts, whereby one actuating-lever is made to do the work, the whole being simple and easy of construction, combining with these advantages great strength without great weight, which said advantages are the object of my invention.

Referring to the accompanying drawings, Figure 1 is a view of my device. Fig. 2 is a section of the case. Fig. 3 shows the application.

Let A represent the base-bar having the slot B, as shown.

To the upper end of the base A is pivoted securely the diverging arms C C, to the ends of which the other arms, D D, are pivoted, said arms D D being made to converge, and are pivoted together at *a*.

E is a slide having on its under side guides to travel in the slot B.

To the forward end of the slide E is pivoted the arms D D, as shown at *a*, the same pivot being made to join the arms together and both to the slide E. The arms D D have their farther ends extending a little beyond the point where they are pivoted to the arms C C, and are there turned up, as shown, to form a portion of the jaws in which the tire is placed.

To the arms D D are pivoted the clamps F F, having their forward inner ends curved and provided with small teeth or a corrugated surface, the better to hold the tire. These clamps F F, together with the turned-up ends of the arms D D, form the jaws, which hold the tire when placed within them. The turned-up ends of the arms D D have on their inner surfaces small teeth, or may be corrugated, like the clamps F F. The slide E has a raised head, *b*, to assist the jaws in holding the tire up.

To the rear ends of the clamps F F are pivoted the bars or rods G G, their forward ends being pivoted to the ends of a cross or head bar, H, which lies above the base-bar A, as shown. From the center of this head-bar H projects the lug I, to which are pivoted the strips J J. These strips J J are provided with holes to adjust the lever K, which is pivoted to them. The lever K extends beyond the strips J J, and is also pivoted to the forward end of the base-bar A, and stands at an angle of about forty-five degrees when about to be operated.

L represents the tire set within the jaws and ready to be upset.

The base-bar A is to be bolted to a bench or block when used for heavy work, or when light work is to be done it may be set upon an anvil.

The operation of my device I thus describe: The tire L is set within the jaws formed by the upturned ends of the arms D D and the clamps F F, and is there held upright, the head *b* on the slide E thereto assisting. When I press the lever K down it draws the head-bar H forward and extends the diamond shape forward by the arms C C and D D, and draws together the angle where the holding-jaws are situated, at the same time forcing the clamps F F to hold one side of the tire against the upturned ends of the arms D D and the head *b* of the slide H, and the tire is thus upset.

This device makes but one movement of the lever necessary to accomplish the entire result, both of holding the tire and shrinking it.

It is obvious that the machine will upset a tire when it is seized by the jaws against the flat side instead of against the edges, for the jaws can be made to approach near enough to hold any thickness.

Having thus described my invention, what I claim as new, and desire to secure by Letters Patent, is—

1. A tire upsetter or shrinker consisting of the base A, arms C C and D D, the latter having their forward ends upturned, said arms forming an extensible diamond shape, and the clamps F F, forming, with the upturned ends of the arms D D, the jaws in which the tire is clamped and held, and the slide E, with its head *b*, substantially as described.

2. In combination with the arms C C and D D and the jaws formed by the clamps F F and the upturned ends of the arms D D, the slide E, having a head, $b$, said slide being pivoted to the arms D D at $a$, and sliding in the groove B of the base-bar A, substantially as and for the purpose herein described.

3. The device for operating the arms C C and D D, the clamps F F, and the slide E, consisting of the bars G G, head-bar H, and lever K, pivoted to the strips J J, and base-bar A, substantially as and for the purpose herein described.

In witness whereof I have hereunto set my hand this 7th day of December, 1880.

JOHN E. TIFFIN.

Witnesses:
   I. M. CECIL,
   H. M. WHITTMORE.